(12) United States Patent
Carisella

(10) Patent No.: US 6,458,233 B2
(45) Date of Patent: *Oct. 1, 2002

(54) METHOD FOR MANUFACTURING A WALL THICKNESS PROGRAM INTO AN ELASTOMERIC TUBULAR COMPONENT FOR INCORPORATION INTO A PACKING DEVICE FOR USE IN A SUBTERRANEAN WELL

(76) Inventor: James V. Carisella, P.O. Box 10498, New Orleans, LA (US) 70181-0498

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,372

(22) Filed: Apr. 12, 1999

(51) Int. Cl.$^7$ ................................................ B65H 81/00
(52) U.S. Cl. ....................... 156/189; 156/191; 156/195; 277/334
(58) Field of Search ................................. 156/189, 191, 156/195, 194, 118; 277/331–334, 340, 341; 166/387, 187, 122

(56) References Cited

U.S. PATENT DOCUMENTS

| | | | | |
|---|---|---|---|---|
| 1,555,587 A | * | 9/1925 | Kline | 156/118 |
| 2,734,582 A | * | 2/1956 | Bagnell | 277/334 |
| 2,778,432 A | * | 1/1957 | Allen | 277/334 |
| 3,023,135 A | * | 2/1962 | Wiltshire | 156/189 |
| 3,629,029 A | * | 12/1971 | Holahan | 156/189 |
| 4,781,249 A | | 11/1988 | Wood | |
| 4,967,846 A | | 11/1990 | Wood | |
| 4,979,570 A | | 12/1990 | Mody | |
| 5,101,908 A | | 4/1992 | Mody | |
| 5,143,154 A | | 9/1992 | Mody | |
| 5,280,824 A | | 1/1994 | Eslinger | |
| 5,361,836 A | | 11/1994 | Sorem | |
| 5,469,919 A | | 11/1995 | Carisella | |
| 5,507,341 A | | 4/1996 | Eslinger | |
| 5,564,504 A | | 10/1996 | Carisella | |
| 5,605,195 A | | 2/1997 | Eslinger | |
| 5,795,524 A | * | 8/1998 | Basso, Jr. et al. | 264/221 |
| 5,813,459 A | | 9/1998 | Carisella | |

OTHER PUBLICATIONS

Eslinger, D.M. "Design and Testing of a High–Performance Inflatable Packer"—SPE 37483—Society of Petroleum Engineers—Copyright 1997.

High Pressure Integrity, Inc. Z–44 Element "2 1/8 inch Double Cover Element With Contoured OD Profile".

* cited by examiner

Primary Examiner—Geoffrey L. Knable

(57) ABSTRACT

A method of manufacturing a wall thickness program onto an elastomeric tubular component, such as an expandable bladder and/or cover element, for incorporation into a packing device for use in a subterranean well includes steps of contouring upon a surface a diametrical configuration defining a wall thickness program for the tubular component. The diametrical configuration is transferred from the surface onto at least one of the walls of the tubular component as a wall thickness program whereby the transfer diametrical configuration conforms substantially as a mirror image of the program on the contoured surface. An elongated mandrel may be provided as the surface onto which the diametrical configuration of the wall thickness program is contoured, such as by machining. Thereafter, the elastomeric tubular component may be prepared on the mandrel, such as by wrapping elastomeric ribbon in layers therearound as the mandrel is manipulated. Extrusion abating heat shrinkable tape may be applied around the uncured elastomer and the elastomer on the mandrel cured under heat to transfer the diametrical configuration from the mandrel onto the tubular component. Alternatively, the diametrical configuration of the elastomeric tubular component may be machined along a constant outer diameter of a blank elastomeric tubular component.

3 Claims, 1 Drawing Sheet

METHOD FOR MANUFACTURING A WALL THICKNESS PROGRAM INTO AN ELASTOMERIC TUBULAR COMPONENT FOR INCORPORATION INTO A PACKING DEVICE FOR USE IN A SUBTERRANEAN WELL

BACKGROUND OF THE INVENTION (1) Field of the Invention

The invention relates to a method of manufacturing a tubular component, such as an inflatable bladder and/or elastomeric cover for subsequent use in a packing device for a subterranean well.

(2) Description of the Prior Art

Inflatable packers, bridge plugs, and the like, have long been utilized in subterranean wells. Such inflatable tools normally comprise an inflatable elastomeric bladder element concentrically disposed around a central body portion, such as a tube or mandrel. A sheath of reinforcing slats or ribs is typically provided exteriorly around the bladder with an elastomeric packing cover concentrically disposed around at least a portion of the sheath. Generally, the central portion of the sheath will remain exposed and without a cover for providing anchoring engagement of the packer to the wall of the well. Pressured fluid is communicated from the top of the well or interior of the well bore by means of a down hole pump to the interior of the body and thence through radial passages provided for such purpose or otherwise around the exterior of the body to the interior of the bladder during inflation.

Normally, an upper securing means engages the upper end of the inflatable elastomeric bladder and the reinforcing sheath (if included in the design), sealably securing the upper end of the bladder relative to the body, while a lower securing means engages the lower end of the bladder and reinforcing sheath, securing the lower end of the bladder for slidable and sealable movement relative to the exterior of the body, in response to inflation forces. An elastomeric cover may be secured to the exterior of the sheath or placed around the exterior of the bladder, in known fashion.

With inflatable packers of this type, it has been observed that the portion of the bladder adjacent to the exposed sheath section of the packer prematurely inflates prior to the other portions of the bladder which are reinforced against expansion by the reinforcing sheath and/or the elastomeric packing cover element. When an exposed portion, such as the exposed sheath section of the packer, expands, one end of the bladder moves toward the other end of the device, and the bladder area adjacent the exposed sheath inflates until it meets the wall of the well bore, which may be cased or uncased. If the well bore is uncased, the well bore will have an earthen wall, and if the well bore is cased, the wall of the well bore will be the internal diameter surface of the casing.

It has been noted in a number of prior art designs that when service conditions encompass moderate expansion ratios, a propensity for the bladder to pinch around the exterior of the body arises, creating either a seal or a convoluted fold in the bladder that sometimes prevents the effective communication of further fluid throughout the bladder and preventing contiguous inflation propagation. The pinching seal and/or fold(s) become entrenched in the bladder whereupon they obstruct further passage of fluid employed for inflating the bladder and therein keep fluid from reaching the farthest portions of the bladder to be inflated. When this occurs in service, it always results in a soft set condition and the imminent loss of seal between the cover and wellbore.

The formation of folds creates unusually high triaxial stresses and strains in the vicinity of the fold. Correspondingly, these triaxial stresses and strains create a condition that causes localized failure of the bladder by means of cracking and/or tearing. Failure occurs because the physical properties of the elastomeric material composing the bladder are not adequate to survive the service conditions, i.e., highly localized triaxial, the bladder is pressed with high magnitudes of force against the ribs, exposure to aggressive inflation and treatment fluids, elevated service temperatures, pressure transients, exposure to low aniline point hydrocarbons and acid gases and the like.

The ability to successfully deflate and retrieve an inflatable device is a common service requirement. A pinch or fold might still have formed in a bladder during inflation even though the inflation element effected a satisfactory seal against the wall of the well. During deflation, a fold can pinch and seal around the body, obstructing the transmission of fluid out of the lower portions of the bladder and thereby prevent complete deflation of the bladder. Once a fold is formed, it is permanently entrenched in the bladder and results in multiple layers of bladder beneath the ribs. These layers, in turn, result in a deflated diameter which is greater than the initial run-in diameter of the inflation element. Retrieval of the device to the earth's surface is thus compromised since the device may not be able to pass through restrictions in the well bore as it is moved upwardly therein. These problems and some prior art solutions are discussed in Eslinger, et al., "Design and Testing of a High-Performance Inflatable Packer," Society of Petroleum Engineers Paper No. 3748 (1997).

In my U.S. Pat. No. 5,813,459 entitled "Programmed Shaped Inflatable Packer Device," issued Sep. 29, 1998, I disclose a method to abate the formation of pinching seals and folds during inflation of prior art devices by providing a series of shape-controlling means on an elastomeric packing cover along the length of the bladder in the form of high and low modulus modules of varying lengths and thicknesses. While this design is an advancement in the art, the design of the modules leaves comparatively sharp angles and significant size differences between the high and low modules. Sometimes these angles and different diameters are of such magnitude that they are easily detected by the naked eye. Additionally, in this prior art device, the thickness of intervals of the cover segments are programmed in concert with the exposed rib section(s) in an effort to control the transitional shapes taken by the inflation element throughout inflation. The bladder in this invention has a constant inside diameter (ID) and a constant outside diameter (OD), i.e., a constant thickness and cross section along its entire length. In such design the cover segments dominate and control the transitional shapes taken by the inflation element throughout inflation.

Prior art techniques of manufacturing bladders and covers for inflatable packing devices for use in subterranean wells have included extrusion methods and conventional mandrel wrapping methods. Bladders in prior art downhole tools have always been of constant ID, OD and thickness. Mandrel wrapped bladders have always been made on constant diameter mandrels except, very large bladders used in external casing packers are sometimes made on a mandrel with a very small draft angle to facilitate sliding removal of the bladder from the mandrel. For all practical intents and purposes the diameter of these mandrels are considered constant as are the thicknesses of the bladders made on these mandrels. Moreover, even this draft angle configuration on the mandrel does not result in providing a wall thickness program onto a tubular component.

Covers in prior art down hole tools have always been made by means of wrapping calendared elastomer onto the ribs of the inflation element or wrapping calendared elastomer onto a constant OD mandrel. Prior art devices having programmed thicknesses over intervals of the cover(s) have had their programmed thicknesses imparted via machining of the cover(s) after it has been bonded and cured on the ribs.

The invention provides a method of manufacturing a tubular component to permit transfer of a wall thickness program or orchestration of the varying sophisticated contours and configurations in the tubular component, i.e., the bladder and/or cover, to provide a uniform expansion profile in an expected, i.e., pre-determinable and repeatable, manner which can be achieved by those skilled in the art with only minimal or nominal experimentation which will be within the ordinary skills of those knowledgeable in the design and use of inflatable elastomeric devices for use in subterranean wells, and by adhering to the teachings herein.

SUMMARY OF THE INVENTION

The present invention provides a method of manufacturing a wall thickness program into an elastomeric tubular component which may thereafter be incorporated into a packing device for use in a subterranean well. The method comprises the steps of contouring upon a surface diametrical configuration which defines a wall thickness program for the tubular component. The diametrical configuration is transferred from the surface onto at least one of the inner or outer walls of the tubular component as a wall thickness program such that the transferred a diametrical configuration conforms substantially as a mirror image of the program on the contoured surface. The surface may be a rotatable mandrel and the contouring may be performed during rotation of the mandrel. In an embodiment of the present invention, a rotatable elongated mandrel is provided upon which an elastomeric tubular conduit is inserted. The diametrical configuration is contoured around either or both of the inner and outer diameters of the elastomeric tubular conduit, such as by machining upon the outer diameter of the conduit, and/or by implacing the diametrical configuration first upon the rotatable elongated mandrel and contouring such configuration by transfer through hydrostatic compression between the mandrel and the tubular conduit within an autoclave through application of heat. In one embodiment, the present method comprises steps of first providing an elongated mandrel which, preferably, will be metallic, such as steel or the like, and will have an exterior surface which is at least substantially equal to the effective length of the desired tubular component to be manufactured. The surface of the elongated mandrel has an original outer diameter which is defined along the surface and may further include a terminal section portion at each end of the mandrel. A diametrical configuration is imparted onto the exterior of the mandrel between the terminal sections. Thereafter, the tubular elastomeric component is formed on the mandrel by wrapping a ribbon of calendared elastomer, in layers, around the mandrel as it is manipulated, such as by rotation, to provide an uncured tubular component having a specified outer diameter. Extrusion abating heat shrinkable tape thereafter is applied around each terminal section of the tubular component to retain the ends during curing. The tape is also wrapped around the OD of the uncured tubular component to apply a substantial hydrostatic compressive force to the tubular component around the mandrel. Curing of the tubular component onto the mandrel is effected by application of heat via steam and/or dry heat in an autoclave. The hydrostatic compressive force on the multiple elastomeric layers fuse to become one unit and thereby transfer the diametral configuration from the mandrel onto the tubular component. The contour of the cured tubular is also fused in place during the curing operation. The ID contour within the elastomeric tubular component become the reverse mirror image of the OD contour of the mandrel. Thereafter, the tape is removed from around the exterior of the tubular component and the tubular component is removed from the mandrel and installed into (or onto) the packing device in known fashion.

A variant of the method comprises the use of a constant outer diameter mandrel and machining the desired diametral configuration onto the outer diameter of the cured elastomeric tubular component.

There are many significant practical benefits afforded by this invention. It provides a repeatable, precise, quality assured, expedient way to manufacture elastomeric tubular with varying thicknesses along its length. This invention provides manufacturers with multiple methods of making elastomeric tubular intended to control or influence the transitional shapes taken by inflation elements throughout inflation.

DESCRIPTION OF THE PREFERRED EMBODIMENTS

Figure 1:
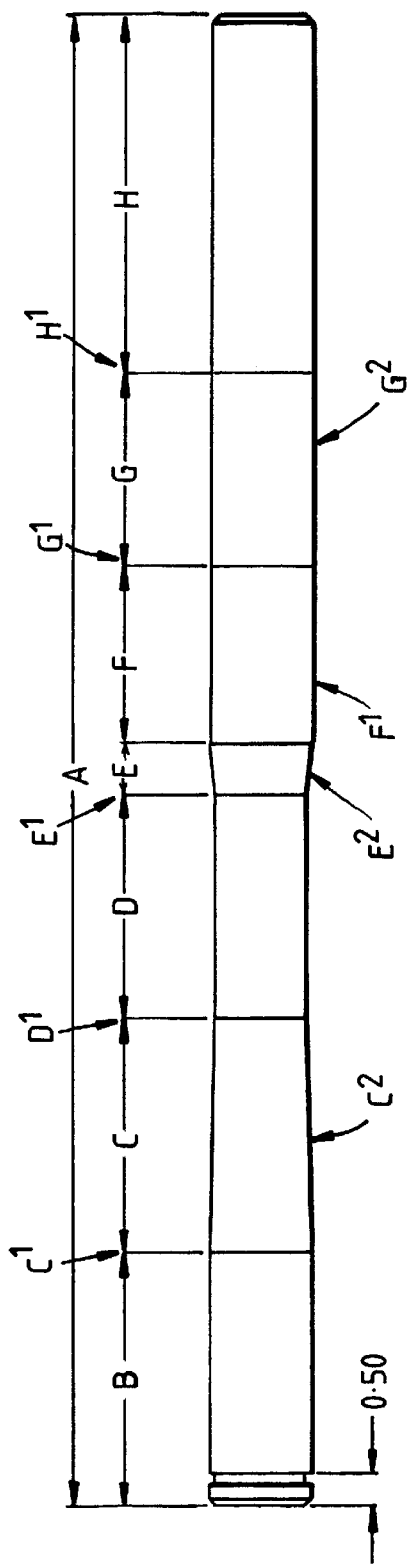
FIG. 1 is an illustration of a wrapping mandrel having its outer diameter contoured for making a bladder with a contoured inner diameter.

Those skilled in the art of designing and utilizing inflatable packing devices for subterranean wells will be familiar with elastomers which can be utilized as bladder components, as well as a cover means contemplated by the invention at hand. The exterior profile occurring in the device during inflation is the result of gradual, fine, reductions and contouring of either the exterior or interior cover surface, which may be accomplished by any conventional machining technique to reduce the initial diameter of such cover means either upon the outer. diameter or the inner diameter, or, in some instances, both. Alteratively, the same procedure may be utilized for contouring of the inflatable bladder or, as previously stated, a combination of contouring upon either the bladder and/or the cover means may be utilized to orchestrate a fine shaping of the inflation profiles taken during effective inflation.

The elastomeric tubular component manufactured by use of the present method may either be an inflatable elastomeric bladder or an elastomeric cover means which can either be an integral part of the bladder or may be a separate component which is arranged radially exteriorally around all or a portion of the inflatable bladder. Those skilled in the art are well familiar with such bladders and cover means. The wall thickness program which is transferred using the present manufacturing method provides for a fine shaping of the inflation profiles taken during effective inflation when incorporated into a packing device for use in the subterranean well.

Preferably, a rigid metallic blank mandrel may be utilized upon which profiled intervals are thereafter imparted along the exterior length of the mandrel to subsequently define a given wall thickness program. This is done in an effort to achieve a mirror image transfer to the internal diameter of the bladder or the cover. I have termed this method as the "reverse mirror mandrel" technique. The mandrel may be either tubular in nature, or may be a solid rod, but it must be resistant to flexing or other deformation when exposed to temperatures on the order of about 500° F. and compressive stresses as high as about 10,000 psi.

The intervals may be imparted onto the exterior of the mandrel in a number of known ways, such as by etching, acidization process, conventional machining or by computerized machining techniques. A small link or terminal section of the mandrel may be left as a working end portion at each end thereof when making the bladder and/or cover upon the mandrel.

When utilizing this "reverse mirror mandrel" technique, the bladder or the cover is formed by wrapping tightly around the mandrel a ribbon of raw, uncured elastomer, such as calendared elastomer. Any number of known elastomers previously utilized by those skilled in the art to make inflatable components for use in inflatable packing devices may be utilized. For example elastomers having ultimate tensile strengths in the range of 1,000 to 5000 psi and no more than about 900% ultimate elongation characteristics, as measured by the applicable ASTM test standards, are acceptable. A satisfactory elastomer is hydrogenated nitrile rubber, which is commercially available. Such elastomer can be processed to achieve the form of a "ribbon" typically having a width of between about 4 to 6 inches and a thickness of about 0.050 to 0.100 inches. Preferably, the raw, uncured elastomeric ribbon is wrapped around the mandrel in an overlapping configuration in one direction such that a spiral configuration is achieved as the mandrel is rotated on a lathe or other means. Preferably, and thereafter, the wrapping is continued in the reverse direction, i.e., first by means of a wrap from top to bottom and then by means of a wrap from bottom to top across the mandrel. This step is repeated, as required, until a pre-determined, specified outer diameter of uncured elastomeric ribbon is wrapped around the mandrel. Thereafter, an extrusion abating dam composed of heat shrinkable tape is applied around the mandrel at each end of the uncured cover or bladder to build each of such ends up until the outer diameter of the respective working ends is substantially equal to the outer diameter of the uncured elastomeric tubular component.

Any tape which resists extrusion of the elastomeric ribbon during curing may be utilized, and it is important that the tape have a heat shrinking characteristic during the curing temperatures along the order of 300°–500° F. A tape manufactured by the Bally Ribbon Mills Corporation of Bally, Pennsylvania and marketed under the name "Natural Nylon Cure Tape" may be utilized as a satisfactory extrusion abating heat shrinkable tape.

The heat shrinkable tape is wrapped around the elastomer, tightly, in multiple layers, also, preferably, in companion spiraling, overlapping configuration for the elastomer. Thereafter, the mandrel with the elastomeric ribbon and tape thereon is introduced into an autoclave having a source of steam and heat. Typically, when the above preferred elastomer and tape are utilized on the mandrel, the autoclave is heated to a temperature of about 275 deg to 500 deg F and the mandrel is retained therein for approximately 45–120 minutes to provide satisfactory hydrostatic compression of the multiple layers of the elastomeric ribbon onto the elastomer and mandrel, resulting in one fused unit of elastomer body being produced. Thereafter, the extrusion abating tape is unwrapped from around the fused unit bladder and the cured elastomer is removed from the mandrel. The bladder may now be incorporated into the packing device in known fashion.

A mandrel used to manufacture a sophisticated bladder for an inflation element with a single exposed anchor section and constant thickness cover is shown in FIG. 1. In FIG. 1, mandrel 100, which is used for making an ID contoured bladder has length A of 69 inches. This is used to make the bladder 200 shown in FIG. 2 which has a length 201 of 64.02 inches. The solid mandrel 100 has a first outer long interval B of 11.75 inches with a constant outer diameter of 1.13 inches. Length B terminates at point $C^1$ which begins a second long interval C of a length of 11.25 inches and having linear taper $C^2$ extending to line $D^1$. A third long interval D is provided beginning at line $D^1$ and has a long interval length of 10.38 inches, without a taper, and also has a continuous outer diameter of 1.06 inches. Long interval D continues to point $E^1$ which is the point of beginning of a second linear taper interval E having linear taper $E^2$ extending outwardly to point $F^1$. Point $F^1$ is the beginning of a long interval F having a length of 8 inches and a continuous outer diameter of 1.21 inches. Long interval F terminates at point G prime which, in turn, defines the beginning point of long interval G having a length of 6 inches and linear taper $G^2$, to point $H^1$. Finally, point $H^1$ defines the beginning of long interval H having a length of 18.63 inches and a continuous outer diameter of 1.06 inches.

Figure 2:
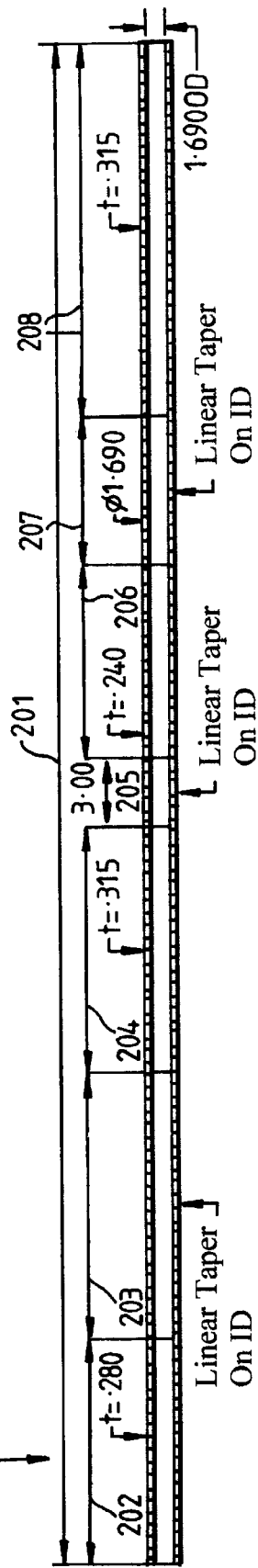
FIG. 2 is a cross-sectional longitudinal view of a contoured bladder made using the mandrel of FIG. 1.

After the bladder 200 shown in FIG. 2 is prepared on the mandrel 100 of FIG. 1, as above described, the bladder 200 is removed from around the exterior of the mandrel 100 and will have the configuration as shown in FIG. 2. As stated above, bladder 200 will have a length 201 of 64.02 inches and will have a first long interval 202 of 9.75 inches with a constant thickness of 0.280 inches followed by a 5° taper transitional interval 203 which seamlessly connects the first interval 202 of constant thickness to a second interval 204 of constant thickness, 0.315" thick. This section 202 is a mirror image contour of the long interval B of the mandrel 100, two inches of this mandrel length B not being used for purposes of preparation of the bladder 200.

A second long interval 203 of the bladder 200 has a length of 11.25 inches and a linear taper conforming to linear taper $C^2$ of the mandrel 100, i.e., from 0.280" to 0.315". The bladder 200 continues with a third length 204 of 10.38 inches which corresponds to long interval length D of the mandrel 100. This length 204 has a continuous outer diameter of 0.315 inches.

Length 205 of the bladder 200 corresponds to interval E on the mandrel 100 and has a linear taper corresponding to linear taper $E^2$ on the mandrel 100. The length 205 on the bladder 200 is followed by a length 206 of 8 inches and a linear taper 207 corresponding to linear taper $G^0$ on mandrel 100 from 0.240 inches to 0.315 inches. Tapered length 207 is 6 inches and corresponds to long interval G on mandrel 100 and terminates in length 208 of 15.63 inches.

In the manufacturing of a cover component, the "reverse mirror mandrel" technique utilized in the manufacture of the bladder may also be utilized for the manufacture of the cover component. The cover component is applied to the mandrel in the same manner as the elastomeric bladder component and the procedure is much the same.

However, the cover segment undergoes additional processing so that they can be bonded onto the inflation element ribs. The ribs are prepared and coated with an adhesive using same basic methods used to bond uncured elastomer onto the ribs, i.e., the inflation element and ribs are used as the wrapping mandrel. The ID surface of the cover segments are mechanically and chemically treated so as to maximize the bond between the ribs and the already cured elastomeric tubular. The inflation element is wrapped with heat shrinkable tape like that described earlier and the inflation element is then processed in an autoclave to effect the bond between the ribs and the covers. After curing in the autoclave for about 45 to 60 minutes, the inflation element is removed from the autoclave and the tape is removed. Completion of the inflation element then continues in routine fashion.

The reverse mirror image technique for providing a wall thickness program into an elastomeric tubular component may also be achieved utilizing a smooth, constant OD metallic mandrel, wrapping calendared ribbon-like elastomer onto the mandrel in a fashion commonly known to those skilled in the art, then applying the extrusion abating heat shrinkable tape around the exterior of the uncured elastomer. The mandrel with the uncured elastomer and tape is then introduced into the autoclave and exposed to either wet or dry heat, as described above. The tape is removed from the cured tubular component after removal from the autoclave and the tubular component is removed from the mandrel. The tubular component then may be placed upon appropriate machining equipment and the desired contour of the wall thickness program machined into the outer diameter of the prepared tubular component.

A combination of machining of the outer diameter of a blank tubular component or a tubular component having either an inner diameter wall obtained through use of the reverse mirror mandrel technique may be used to produce the resultant bladder or cover products.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A method of manufacturing a wall thickness program into an elastomeric tubular component for incorporation into a packing device for use in a subterranean well, comprising the steps of:
   (1) providing an elongated mandrel having an exterior surface at least substantially equal to the effective length of the tubular component, said surface having an original outer diameter defined by said surface, said mandrel further including a terminal section at each end thereof;
   (2) contouring along the original outer diameter of said mandrel between said terminal sections a diametrical configuration transferable as a wall thickness program onto the tubular component;
   (3) forming the tubular component on the mandrel by wrapping therearound a ribbon of elastomer in layers to provide an uncured tubular component having a specified outer diameter;
   (4) introducing extrusion abating heat shrinkable tape around each terminal section of the mandrel to increase the outer diameter of each terminal section to substantially equal the specified outer diameter of the uncured tubular component;
   (5) wrapping the tape around the uncured tubular component to apply a compressing force to the tubular component around the mandrel;
   (6) curing the tubular component onto the mandrel by thermal application in an autoclave at a temperature from between about 275 degF and about 500 degF to hydrostatically compress the multiple layers of ribbon of elastomrer into one fused unit and to transfer the diametric configuration from the mandrel onto the tubular component;
   (7) removing the tape from around the exterior of the cured tubular component; and
   (8) removing the tubular component from the mandrel.

2. A method of manufacturing a wall thickness program into an elastomeric tubular component for incorporation into a packing device for use in a subterranean well, comprising the steps of:
   (1) providing an elongated mandrel having an exterior surface at least substantially equal to the effective length of the tubular component, said surface having an original outer diameter defined by said surface, said mandrel further including a terminal section at each end thereof;
   (2) contouring along the original outer diameter of said mandrel between said terminal sections a diametrical configuration transferable as a wall thickness program onto the tubular component;
   (3) forming the tubular component on the mandrel by wrapping therearound a ribbon of elastomer in layers to provide an uncured tubular component having a specified outer diameter;
   (4) introducing extrusion abating heat shrinkable gape around each terminal section of the mandrel to increase the outer diameter of each terminal section to substantially equal the specified outer diameter of the uncured tubular component;
   (5) wrapping the tape around the uncured tubular component to apply a compressing force to the tubular component around the mandrel;
   (6) curing the tubular component onto the mandrel by thermal application of steam in an autoclave at a temperature from between about 275 degF and about 500 degF to hydrostatically compress the multiple layers of ribbon of elastomer into one fused unit and to transfer the diametric configuration from the mandrel onto the tubular component;
   (7) removing the tape from around the exterior of the cured tubular component; and
   (8) removing the tubular component from the mandrel.

3. A method of manufacturing a wall thickness program into an elastomeric tubular component for incorporation into a packing device for use in a subterranean well, comprising the steps of:
   (1) providing an elongated mandrel having an exterior surface at least substantially equal to the effective length of the tubular component, said surface having an original outer diameter defined by said surface, said mandrel further including a terminal section at each end thereof;
   (2) contouring along the original outer diameter of said mandrel between said terminal sections a diametrical configuration transferable to the interior of said tubular component;
   (3) forming the tubular component on the mandrel by wrapping therearound a ribbon of elastomer in layers to provide an uncured tubular component having a specified outer diameter;
   (4) applying extrusion abating heat shrinkable tape around each terminal section of the mandrel to increase the outer diameter of each terminal section to substantially equal the outer diameter of the uncured tubular component and wrapping the tape around the uncured tubular component to apply a compressive force to the tubular component around the mandrel;

(5) curing the tubular component onto the mandrel by thermal application of steam in an autoclave to hydrostatically compress the multiple layers of ribbon of elastomer into one fused unit and to transfer the diametrical configuration from the mandrel onto the tubular component;

(6) removing he tape from around the exterior of the cured tubular component; and (7) removing the tubular component from the mandrel.

* * * * *